3,511,879
CYCLOBUTENE IMINES AND ALLENE AMIDINES AND PREPARATION THEREOF
Robert Fuks, Brussels, and Heinz G. Viehe, Linkebeek, Belgium, assignors to Union Carbide Corporation, a corporation of New York
No Drawing. Filed Oct. 19, 1966, Ser. No. 587,694
Int. Cl. C07c 121/30, 119/00, 123/00
U.S. Cl. 260—566          8 Claims

ABSTRACT OF THE DISCLOSURE

Cyclobutenes and/or allenes of the respective formulae:

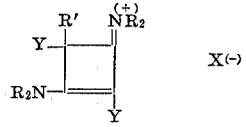

and

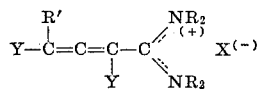

wherein, for example, Y can be phenyl, R' can be hydrogen, R can be ethyl, and X can be bromine, are prepared by contacting aminoacetylenes with hydrogen halides, hydrocarbon halides or boron fluoride compounds. The compounds provided by the invention are useful as ultraviolet light absorbers and as hydrogen halide acceptors.

---

This invention relates to derivatives of aminoacetylenes. More particularly the invention is directed to compounds which are dimerization-alkylation or dimerization-protonation derivatives of aminoacetylenes and to methods for producing such compounds.

The compounds of this invention are those represented by the formulas (A)   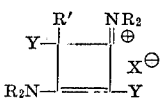

(B)   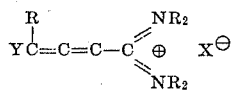

(C)   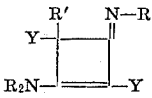

(D)   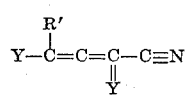

(E)   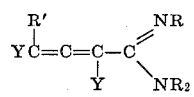

(F)   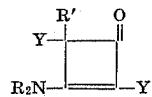

In the above Formulas A–F, Y represents hydrogen, a monovalent hydrocarbon group or an $NR_2$ group, R' represents hydrogen or methyl, R represents a monovalent hydrocarbon group, two R groups on the same nitrogen atom can together form a divalent organic group, and X represents one of the halogens chlorine, bromine or iodine, or $BF_4$.

The compounds of Formulas A and B are produced by the reaction of two molecules of an aminoacetylene represented by the formula (G)   

with one molecule of a compound represented by the formula (H)          R"X

In Formulas G and H, the Y, R and X groups have the meanings defined hereinabove with reference to Formulas A–F, and R" is hydrogen or a monovalent hydrocarbon group bonded to X through an aliphatic carbon atom (that is, a carbon atom which is not part of an aromatic ring system) of such R" group. The group X is $BF_4$ only when R" is hydrogen. Preferably, R" is free from aliphatic unsaturation.

The compounds of Formulas C–F are produced from compounds of Formulas A and or B by additional steps.

In the compounds of Formulas A–H, the R group and the Y, R' and R" groups (when such Y, R' and R" groups represent monovalent hydrocarbon groups) preferably contain from one to about 18 carbon atoms and are free from acetylenic unsaturation. When two R groups on the same nitrogen atom together form a divalent organic group, such divalent organic group preferably contains at least 5 carbon atoms or at least 4 carbon atoms plus a nitrogen atom or an oxygen atom. Preferably Y is a monovalent hydrocarbon group.

The various R and Y groups can be the same or different throughout a particular molecule, and can contain substituents which are not reactive under the conditions of the protonation or alkylation reactions of this invention, such as fluoro, chloro, $NO_2$ and OR, where R has the meaning defined hereinabove.

The process of this invention comprises contacting an aminoacetylene of Formula G with a compound of Formula H until a compound of Formula A, a compound of Formula B, or a mixture of compounds of Formulas A and B is produced.

The process of the present invention can be carried out with or without a solvent. However, an inert organic solvent can be used and suitable inert solvents include hydrocarbons and hydrocarbon ethers, for example, hydrocarbons such as petroleum ether, cyclohexane, 2- ethylhexane, benzene, toluene, xylene and the like, and ethers such as diethyl ether, di-isopropyl ether, methylbutyl ether, dioxane, tetrahydrofuran, ethylene glycol dimethyl ether, diethylene glycol dimethyl ether, and the like. When one of the reactants is a liquid, it is generally more convenient to omit an additional inert solvent.

The temperature at which the process of this invention is carried out can vary widely depending upon the particular reactants, and the proper choice of temperature is illustrated by the examples hereinbelow. Usually, temperatures from about —20° C. up to about 200° C. are satisfactory. In the case where R" in the reactant of Formula H is hydrogen, temperatures of 0° C. or below are preferred. Otherwise, temperatures above 50° C. are preferred. When a solvent is employed, the boiling point of the solvent is often a convenient elevated temperature.

There is no particular advantage to be gained in carrying out the process of this invention at pressures other than atmospheric pressure. However, when a sealed reaction vessel is employed, the autogeneous pressure of the reaction mixture at the reaction temperature is satisfactory.

Since aminoacetylenes react readily with water, it is preferable to carry out the process of this invention under anhydrous conditions. This may be conveniently done by using sealed vessels, or an atmosphere of inert gas such as nitrogen, helium, argon, and the like.

The reactant mole ratio is generally not critical. However, best yields of product are obtained when the mole ratio of aminoacetylene of Formula G to reactant of Formula H is about two to one, that is the reactant ratio called for by the stoichiometry of the dimerization-alkylation or dimerization-protonation reaction.

The order of mixing of the reactants is generally not critical. However, when R″ in the reactant of Formula H is hydrogen, the reactant of Formula H should be slowly added to the aminoacetylene reactant, and preferably the reactant ratio should be at least two moles of aminoacetylene to one mole of compound of Formula H. Otherwise direct addition of the R″X reactant to the aminoacetylene triple bond will take place rather than the dimerization-protonation reaction of the process of this invention.

The reaction of the process of this invention takes place in good yield in reaction times of from a few minutes up to several days depending on the particular temperature, solvent, the particular reactants, and the like.

The products produced by the process of this invention can be separated from the reaction mixture by conventional methods including separation of liquid products from solid matter, the isolation of the desired product by evaporation of solvent, fractional distillation, and the like. Several methods of product recovery are illustrated in the examples hereinbelow.

When R″ in the reactant of Formula H is methyl, the dimerization-alkylation reaction of this invention takes place and R′ in the products of Formulas A and B is methyl. When R″ is hydrogen or any monovalent hydrocarbon group other than methyl, the dimerization-protonation reaction takes place predominantly and R′ in the products of Formulas A and B is hydrogen. That is, when R″ is a monovalent hydrocarbon group other than methyl, the reactant R″X generally serves as a source of HX, and relatively insignificant amounts of dimerization-alkylation product are produced in which the R′ group in the dimerization-alkylation product is identical with the R″ group in the compound of Formula H and the R′ group is bonded to the remainder of the molecule through an aliphatic carbon atom of the R′ group. It has also been found that when R″ in the reactant of Formula H is not methyl, the reaction product is primarily a compound of Formula A with only insignificant amounts of compounds of Formula B.

Compounds of Formula E can be prepared by heating (generally at temperatures above 150° C.) compounds of Formula B in vacuum or an inert atmosphere. An inert solvent can also be used if desired. Under similar reaction conditions, compounds of Formulas C and D, together with relatively small amounts of compounds of Formula E, can be prepared by heating compounds of Formula A. The net result of the heating step is the loss of one or two molecules of RX from the compound of Formula A or B. In general, somewhat higher temperatures are required to convert compounds of Formula A to compounds of Formula C or D than are required to convert compounds of Formula B to compounds of Formula E.

Where the R groups in compounds of Formulas A and B are not the same, the R group having the more easily broken R—N bond will be eliminated. It has been found, for example, that a typical order of decreasing ease of R—N bond breaking is allyl-N, benzyl-N, methyl-N, ethyl-N, n-propyl-N, and phenyl-N.

Also where two R groups on the same nitrogen atom of a compound of Formulas A and B form a divalent organic group, elimination of RX by heating takes place within the molecule. For example, heating

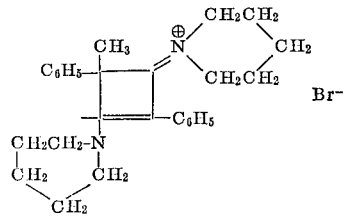

yields

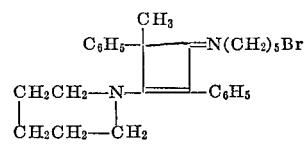

The compounds of Formulas C and E can be converted back to compounds of Formulas A and B, respectively, by treatment with hydrocarbon halides such as RBr, where R has the meaning defined above.

The anion X in the compounds of Formulas A and B can also be replaced by other anions of conventional methods.

The compounds of Formula F can be produced by the basic hydrolysis of compounds of Formulas A and C, for example, by treatment with an aqueous solution of sodium hydroxide or potassium hydroxide.

The R groups and the monovalent hydrocarbon Y groups in Formulas A–G can be alkyl, aryl, alkaryl, aralkyl, alkenyl, alkynyl, cycloalkyl, cycloalkenyl, and the like groups. For example, the R and Y groups can be methyl, ethyl, n-butyl, tertiary-butyl, 2,2-dimethyl-n-propyl, iso-octyl, octadecyl, phenyl, phenylethyl, terphenyl, cumyl, mesityl, cyclopentyl, ethylcyclohexenyl or allyl groups, and the like, and two R groups on the same nitrogen atom can together be tetramethylene, 3-ethylhexamethylene, decamethylene,

—CH₂CH₂CH₂OCH₂CH₂CH₂—

—CH₂CH₂NCH₂CH₂— and the like. The R″ groups in the compounds of Formula H can be any of the above groups illustrative of R and Y groups, provided the available bond on the R″ group is from an aliphatic carbon atom.

Throughout the present specification and claims, $C_2H_5$, $C_6H_{11}$, $C_6H_5$, $C_6H_4$, $C_4H_9$, i-$C_4H_9$, and t-$C_4H_9$ represent, respectively, the ethyl, cyclohexyl, phenyl para-phenylene, normal butyl, isobutyl and tertiary butyl groups.

Illustrative compounds represented by Formula G are the following:

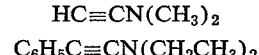
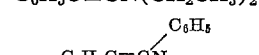
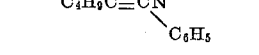
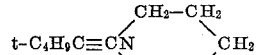
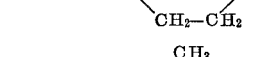
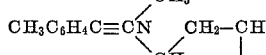
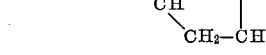
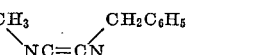
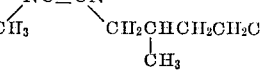

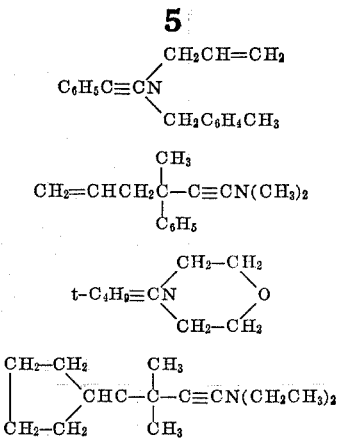

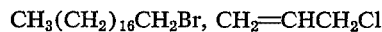

The compounds of Formula G can be prepared by known methods, for example those described in French Pats. No. 1,422,427; 1,418,714; and 1,447,406.

Illustrative compounds represented by Formula H are the following $CH_3I$, $C_4H_9Cl$, $C_6H_5CH_2Br$, $C_6H_{11}Br$, $$CH_3(CH_2)_{16}CH_2Br, CH_2=CHCH_2Cl$$

$CH_3C_6H_5CH_2CH_2I$ and $t\text{-}C_4H_9I$.

The compounds of Formula H are known or can be prepared by known methods.

Illustrative compounds represented by Formula A are the following:

(i)

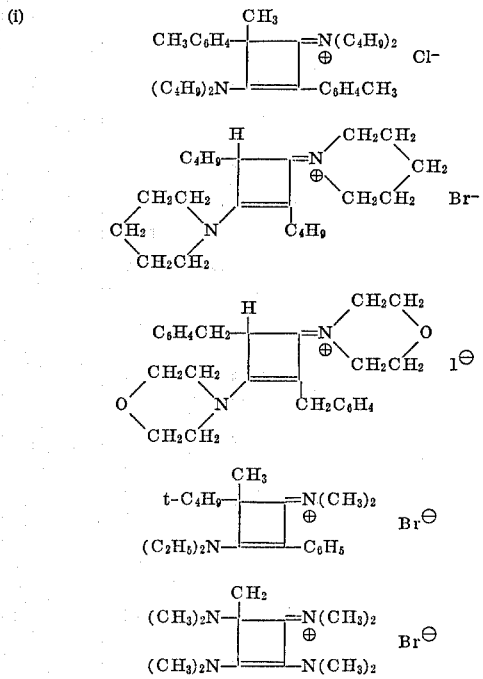

Illustrative compounds represented by Formula B are the following:

(ii)

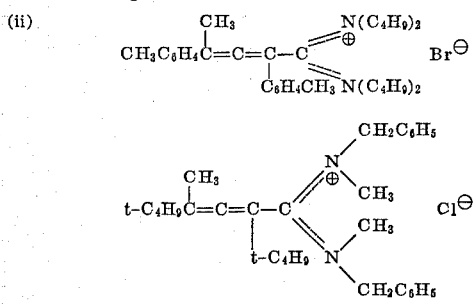

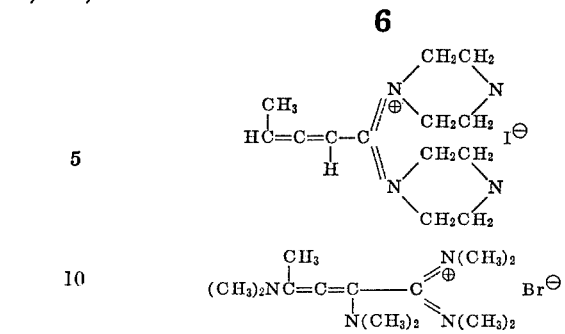

Illustrative compounds of Formulas C, D, E and F are those prepared from the compounds of Formulas A and B by the methods described hereinabove. For example: heating compound (i) gives a mixture of the three compounds (iii)

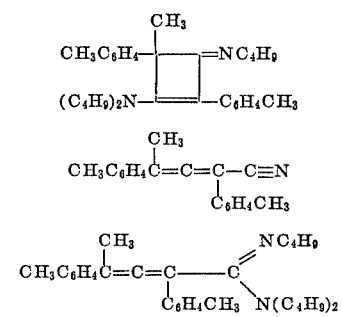

heating compound (ii) gives the compound

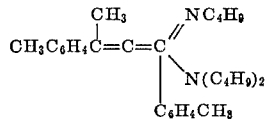

and hydrolysis of compound (i) or compound (iii) with aqueous NaOH gives

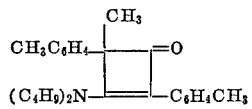

The compounds of Formulas A and B are useful because of their ability to absorb ultraviolet light, and aqueous solutions of these compounds can be used as filters for ultraviolet light.

The compounds of Formulas C and E, and the compounds of Formula D where Y is $NR_2$ contain basic nitrogen atoms and are useful under anhydrous conditions as hydrogen halide acceptors. For example, all of the compounds of Formulas C and E and of Formula D where Y is $NR_2$ can be used as hydrogen halide acceptors in the process for producing cyclopentadienyl metal compounds described in U.S. Pat. 3,071,605.

Compounds of Formula D where Y is hydrogen or monovalent hydrocarbon and compounds of Formula F can be first treated with hydrogen to reduce, respectively, the —C≡N group to —$NH_2$ and the ketone to $CH_2$ and then used as hydrogen halide acceptors in the manners described above.

The following examples further illustrate the process and composition of this invention. In the examples the designations compound (a), compound (b), etc. refer to compounds having the following structures:

Compound (a)  $t\text{—}C_4H_9C{\equiv}CN(CH_3)_2$ (b)

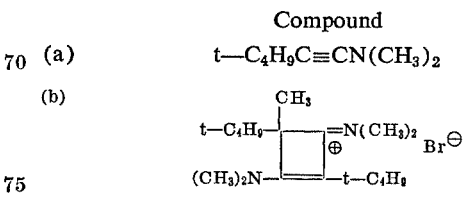

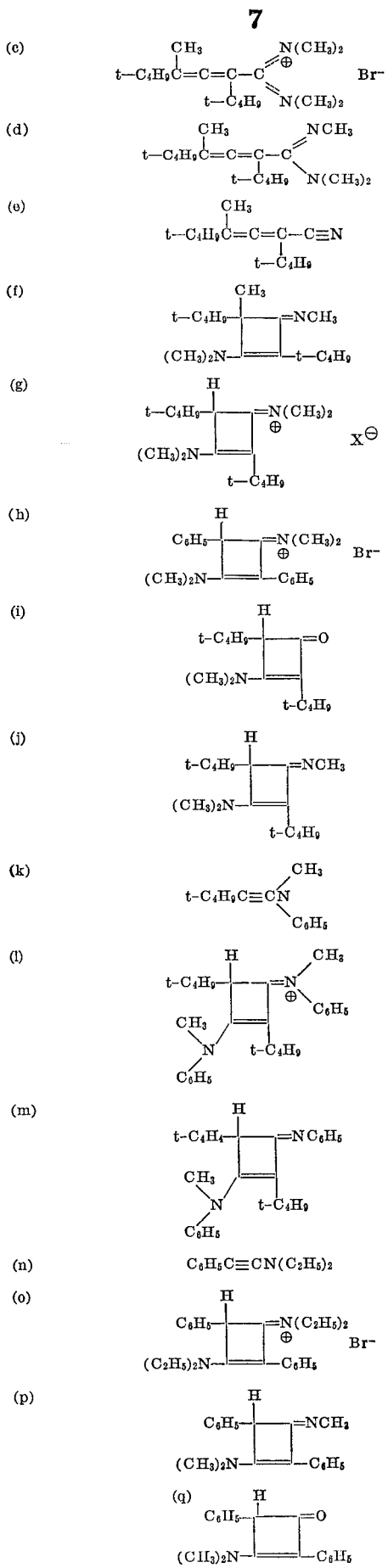

EXAMPLE 1

A mixture of 5.3 g. (0.042 mole) of compound (a) and 3.4 g. (0.036 mole) of CH₃Br was heated at 90° C. in a sealed vessel for 30 hours. The crystalline product [5.5 g., 73% yield based on product mixture of ⅔ compound (c) and ⅓ compound (b)] was washed with diethyl ether. Next 25 ml. of acetone was added at room temperature to a 4 gram sample of the product mixture. The acetone-insoluble fraction (1 g.) was separated and recrystallized twice from hot acetone to yield a product (M.P. 137–138° C.) which was identified as compound (c).

The acetone solution containing the acetone-soluble fraction was evaporated to dryness and heated under vacuum at 225–230° C. for 30 minutes. Compound (d), 1.9 grams, was recovered from the distillate. The solid residue was recrystallized twice from hot acetone to yield a product (1 g., M.P. 251–252° C.) which was identified as compound (b).

EXAMPLE 2

A sample of compound (c), 0.1085 g., was heated in vacuum at 225–230° C. for 20 minutes. The product (0.074 g., 94% yield, B.P. 67–70° C.) (0.2 mm. Hg) was identified as compound (d).

EXAMPLE 3

A sample of compound (b) was heated in vacuum by slowly raising the temperature to 240–250° C. The resulting product mixture was separated by vapor phase chromatography to yield three products which were identified as compound (f) B.P. 140° C./12 mm. Hg; compound (d); and compound (e), M.P. 32–33° C.

EXAMPLE 4

A sample of compound (d), 0.3 g., and an excess of CH₃Br were placed in a sealed vessel and heated at 60° C. for 3 hours. A crystalline precipitate formed on cooling the vessel. The precipitate was washed with diethyl ether, filtered, and recrystallized from acetone to give 0.395 g. (92% yield) of compound (c).

In a similar manner the reaction of compound (f) with CH₃Br gave compound (b) in 77% yield.

EXAMPLE 5

A mixture of 3.75 g. (0.03 mole) of compound (a) and 2.1 g. (0.015 mole) of t-butylbromide was heated at 120° C. in a sealed vessel for 5 hours. The crystalline product was washed with diethyl ether and then twice recrystallized from ethanol to yield a product (2.6 g., 52% yield, M.P. 267–270° C. with decomposition) which was identified as compound (g) with X=Br.

In a similar manner, a sample of compound (a) was reacted with t-butylchloride to give a product (44% yield, M.P. 258° C.) which was identified as compound (g) with X=Cl.

In a similar manner, a sample of C₆H₅C≡CN(CH₃)₂ was reacted with t-butyl bromide to give a product (M.P. 261° C.) which was identified as compound (h).

EXAMPLE 6

A solution of HCl in CH₂Cl₂ (20 ml., containing 0.003 mole of HCl) was added slowly to 0.006 mole of compound (a) at −5° C. Part of the CH₂Cl₂ was evaporated, a few drops of water were added, and the solution was extracted with chloroform. The chloroform extract was dried and evaporated to dryness to give a product (0.4 g.) which was identified as compound (g) with X=Cl.

EXAMPLE 7

A mixture of 0.43 g. of compound (g) X=Br and 10 ml. of 5% aqueous NaOH was heated at 80° C. for one one hour. An oily product solidified on cooling, and was extracted with diethylether. The ether was dried and evaporated to dryness. The residue was recrystallized from petroleum ether to give a product (0.13 g., M.P. 69° C.) which was identified as compound (i).

EXAMPLE 8

A sample of compound (g) X=Cl was heated under vacuum to 275° C. The product (B.P. 130° C./12 mm. Hg) was identified as compound (j).

EXAMPLE 9

A sample of compound (a), 1.25 g., was dissolved in 5 ml. of diethyl ether and maintained at room temperature. To this solution was slowly added 1.4 ml. of BF$_3$-diethyl etherate containing a trace of water, and a crystalline precipitate formed. The reaction mixture was maintained at room temperature for one hour. More ether was added and additional precipitate formed. The reaction mixture was filtered, and the solid fraction recrystallized from ethanol to give a product (1 g., 59% yield, M.P. 219–220° C.) which was identified as compound (g) X=BF$_4$.

A portion of this product (0.572 g.) was mixed with 25 ml. of 5% aqueous NaOH and heated at 85° C. overnight. The reaction mixture was treated as in Example 7 to yield 0.29 g. of compound (i).

EXAMPLE 10

A mixture of 3.75 g. (0.02 mole) of compound (k) and 1.37 g. (0.01 mole) of t-butyl bromide was heated at 135° C. in a sealed vessel for 40 hours. The resulting reaction mixture was dissolved in water and extracted with chloroform. The chloroform extract was evaporated to dryness to give a product (4 g.) which was identified as compound (l).

This sample of compound (l) was heated under vacuum at 250° C. to give 2 g. of product distillate which was redistilled at 160° C./0.01 mm. Hg to give a white solid. This solid was recrystallized from acetone to give a product (M.P. 134–135° C.) which was identified as compound (m).

EXAMPLE 11

A mixture of 3.5 g. (0.02 mole) of compound (n) and 1.64 g. of t-butyl bromide was heated at 100° C. in a sealed vessel for 10 hours. The resulting solid material was filtered, washed with diethyl ether and recrystallized from acetone-ether to give a product (3.8 g., 89% yield, M.P. 208° C.) which was identified as compound (o).

EXAMPLE 12

A sample of compound (h) was heated at 280–300° C. in vacuum to produce compound (p), M.P. 120° C.

A second sample of compound (h) was mixed with 5% aqueous NaOH and heated at 100° C. for about 2 minutes to produce compound (q), M.P. 144° C.

What is claimed is:

1. A compound selected from the group consisting of compounds of the formulae:

$$Y-\underset{R_2N-}{\overset{R'}{\boxed{\phantom{xx}}}}\!\!\!=\!\!NR_2^{(+)} \;\; X^{(-)}$$

and $$Y-\underset{Y}{\overset{R'}{C}}=C=C-C\underset{NR_2}{\overset{NR_2}{\diagup}} \;\; X^{(-)}$$

wherein Y is hydrogen, NH$_2$ or a hydrocarbon group having up to 18 carbon atoms; R is a hydrocarbon group of up to 18 carbon atoms; R' is hydrogen or methyl and X is chlorine, bromine, iodine, or BF$_4$.

2. A compound of the formula:

$$C_6H_5-\underset{R_2N-}{\overset{R'}{\boxed{\phantom{xx}}}}\!\!\!=\!\!NR_2^{(+)} \;\; Br^{(-)}$$

wherein R' is hydrogen and all four R groups are ethyl.

3. A compound of the formula:

$$C_6H_5-\underset{R_2N-}{\overset{R'}{\boxed{\phantom{xx}}}}\!\!\!=\!\!NR_2^{(+)} \;\; Br^{(-)}$$

wherein R' is hydrogen and all four R groups are methyl.

4. A compound of the formula:

$$Y-\underset{R_2N-}{\overset{R'}{\boxed{\phantom{xx}}}}\!\!\!=\!\!NR_2^{(+)} \;\; Br^{(-)}$$

wherein Y is tertiary butyl, R' is hydrogen and all four R groups are methyl.

5. A compound in accordance with claim 1 wherein Y is alkyl and R is free of acetylenic unsaturation.

6. The process which comprises contacting an amino acetylene of the formula YC≡CNR$_2$ with a compound of the formula R″X under anhydrous conditions to produce compounds of one or both of the formulae:

$$Y-\underset{R_2N-}{\overset{R' \;\; NR_2^{(+)}}{\boxed{\phantom{xx}}}}\!\!\!-Y \;\; X^{(-)}$$

and $$Y-\underset{Y}{\overset{R'}{C}}=C=C-C\underset{NR_2}{\overset{NR_2}{\diagup}}(+) \;\; X^{(-)}$$

wherein Y is hydrogen, NR$_2$ or a hydrocarbon group having up to 18 carbon atoms; R is a hydrocarbon group having up to 18 carbon atoms; R″ is hydrogen or alkyl having up to 18 carbon atoms, R' is hydrogen or methyl; X is chlorine, bromine, iodine or BF$_4$ and when R″ is hydrogen the compound of the formula R″X is slowly added to said aminoacetylene.

7. The process of claim 6 wherein R″ is hydrogen and the process is carried out at a temperature of about −20° C. to about 0° C.

8. The process of claim 6 wherein Y is alkyl and R is free of acetylenic unsaturation.

References Cited

UNITED STATES PATENTS 2,975,188   3/1961   Gold et al. _____ 260—465.9 X

OTHER REFERENCES

Olomucki et al., Chemical Abstracts, vol. 58, p. 2429d, (1963).

Criegee et al., Chemische Berichte, vol. 98, No. 2, pp. 387–394 (1964).

CHARLES B. PARKER, Primary Examiner

D. H. TORRENCE, Assistant Examiner

U.S. Cl. X.R.

252—189, 300; 260—239, 247, 247.5, 247.7, 268, 293, 294.7, 326.8, 326.85, 326.86, 465, 465.5, 465.9, 563, 564, 570.4, 570.8, 570.9, 576, 583